United States Patent
Sawyer et al.

(10) Patent No.: US 7,073,108 B2
(45) Date of Patent: *Jul. 4, 2006

(54) COMMUNICATIONS JACKS INCLUDING TEST CIRCUITS AND RELATED CIRCUITS AND METHODS

(75) Inventors: Charlie Sawyer, Orlando, FL (US); Isaac D. White, Orlando, FL (US); James E. Dickens, Ocoee, FL (US); Blake R. Urban, Lenoir, NC (US); Kevin Forsberg, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 519 days.

This patent is subject to a terminal disclaimer.

(21) Appl. No.: 10/419,415

(22) Filed: Apr. 21, 2003

(65) Prior Publication Data

US 2004/0221213 A1   Nov. 4, 2004

(51) Int. Cl.
*G01R 31/28* (2006.01)
*H04M 3/08* (2006.01)

(52) U.S. Cl. .......................... 714/724; 379/30
(58) Field of Classification Search .......... 714/724; 379/30
See application file for complete search history.

(56) References Cited

U.S. PATENT DOCUMENTS

| | | | | |
|---|---|---|---|---|
| 5,613,873 A | * | 3/1997 | Bell, Jr. ...................... | 439/490 |
| 5,751,789 A | * | 5/1998 | Farris et al. ............. | 379/32.04 |
| 5,974,139 A | | 10/1999 | McNamara et al. ........ | 379/399 |
| 6,795,552 B1 | * | 9/2004 | Stanush et al. ........ | 379/413.01 |

* cited by examiner

*Primary Examiner*—Guy Lamarre
*Assistant Examiner*—James C. Kerveros
(74) *Attorney, Agent, or Firm*—Myers Bigel Sibley &Sajovec

(57) ABSTRACT

A jack for a communications line can include first and second input terminals configured to receive respective first and second conductors of a communications line, and first and second output terminals electrically coupled to the respective first and second input terminals. The first and second output terminals can be configured to provide electrical coupling with respective first and second conductors of a communications device. A test switch can electrically couple the first and second input terminals responsive to activation thereof, and an indicator circuit can provide indication of a completed electrical circuit through the test switch.

51 Claims, 5 Drawing Sheets

COMMUNICATIONS JACKS INCLUDING TEST CIRCUITS AND RELATED CIRCUITS AND METHODS

CROSS REFERENCE TO RELATED APPLICATIONS

The present application is related to application Ser. No. 10/419,409 entitled "Communications Devices Including Test Circuits And Related Circuits And Methods" and filed concurrently herewith. The disclosure of application Ser. No. 10/419,409 is hereby incorporated herein in its entirety by reference.

FIELD OF THE INVENTION

The present invention generally relates to communications, and more particularly to test circuits and related methods.

BACKGROUND

A residence is conventionally wired for telephone service using twisted wire pairs according to the RJ11 standard. The telephone service provider generally provides service to a network interface device (NID) outside the residence, and service for a telephone line is provided using a communications line including one tip conductor and one ring conductor running from the telephone service provider's central office to the network interface device of the residence. Conventionally, the tip and ring conductors comprise twisted wires. Within the residence, a plurality of communications lines run from the network interface device to respective telephone jacks within the residence. Each of these communications lines within the residence includes a tip conductor and a ring conductor. In addition, one or more communications devices, such as telephones, modems, computers, caller identification units, and/or facsimile machines, may be detachably coupled to one or more telephone jacks.

When a residential customer experiences trouble with phone service, the telephone service provider is generally responsible for repairs required outside the residence, and the residential customer is generally responsible for repairs required inside the residence. More particularly, the network interface device is usually the demarcation point with the telephone service provider being responsible for repairs outside the residence to the network interface device, and with the residential customer being responsible for repairs inside the residence to the network interface device. Moreover, regardless of where a problem may exist, the problem should be isolated before a repair can be performed either inside or outside the residence.

A problem outside the residence can be isolated by decoupling the outside communications line from the network interface device and testing the single pair of (tip and ring) conductors. A problem inside the residence, however, may be more difficult to isolate because there are likely to be a plurality of communications lines and communications devices inside the residence, and a failure of any one communications line or device may result in diminished service and/or service failure.

When a problem with service occurs, a technician (either independent or from the telephone service provider) may readily have the skills and tools to effectively diagnose and correct the problem. When relying on a technician, however, the customer may have to wait for an available technician delaying restoration of service and/or the customer may incur expense if the problem is inside the residence. Accordingly, a customer may wish to first attempt to isolate and possibly fix the problem before requesting service from a technician to reduce time without service and/or reduce cost. A customer, however, may not have the skills and/or tools to effectively diagnose or fix the problem.

Regardless of who attempts to fix a service problem, once it is determined that the outside line is functioning properly, the inside communications lines and devices should be isolated and tested separately until the problem line and/or device is isolated. Once the problem line and/or device has been isolated, it can be repaired, replaced, or removed.

If the customer attempts to diagnose and repair the problem, customer service personnel of the telephone service provider may be contacted to guide the customer through the process. First, the customer can take a working telephone to the NID and check for a dial tone there to determine if the problem is inside or outside the residence. If a dial tone can be obtained at the NID, the problem is inside. Then all communications devices inside the residence can be unplugged. If a working telephone can obtain a dial tone at each telephone jack, the problem is with one of the communications devices that has been unplugged. The communications devices can then be plugged in individually to determine which device is not functioning properly. Even if the customer manages all of the steps above, many customers may have difficulty diagnosing and fixing a problem that exists with communications lines inside the residence.

SUMMARY

According to embodiments of the present invention, a jack for a communications line may include first and second input terminals configured to receive respective first and second conductors of a communications line, and first and second output terminals electrically coupled to the respective first and second input terminals, with the first and second output terminals being configured to provide electrical coupling with respective first and second conductors of a communications device. A test switch can be configured to electrically couple the first and second input terminals responsive to activation thereof, and an indicator circuit can be configured to provide indication of a completed electrical circuit through the test switch. Moreover, the test switch can be manually activated.

More particularly, the indicator circuit may include a battery and at least one light emitting diode electrically coupled in series with the test switch between the first and second input terminals. For example, the test switch, the battery, and the at least one light emitting diode can be provided on a bridge between the first and second input terminals so that electrical couplings between the first and second input and output terminals are free of the test switch, the battery, and the at least one light emitting diode. The at least one diode can be visible from a front surface of the jack. In addition, the at least one diode may include two parallel connected light emitting diodes connected in opposing directions.

In an alternative, the at least one light emitting diode may include at least a first light emitting diode connected in series between the first input terminal and the first output terminal. The at least one light emitting diode may also include at least a second light emitting diode connected in series between the second input terminal and the second output terminal.

The first and second conductors of the communications line may be first and second wires of a telephone communications line such as an RJ11 communications line. Accordingly, the first and second output terminals may be first and second output terminals of an RJ11 communications port. The first and second output terminals can thus provide a detachable electrical coupling with respective first and second conductors of a communications device.

The jack can also include a faceplate having front and back surfaces wherein the first and second input terminals are on the back surface of the faceplate and wherein the first and second output terminals are on the front surface of the faceplate. Moreover, the back mounting surface can be configured for mounting on a wall.

According to additional embodiments of the present invention, a test circuit may be provided for a communications line including first and second conductors. In particular, the test circuit may include a test switch configured to electrically couple the first and second conductors of the communications line responsive to activation thereof, and an indicator circuit can provide indication of a completed electrical circuit through the test switch. The test switch can be manually activated.

The indicator circuit may include a battery and at least one light emitting diode electrically coupled in series with the test switch. For example, the test switch, the battery, and the at least one light emitting diode can be provided between the first and second conductors of the communications line so that electrical couplings between the first and second conductors and a communications device are free of the test switch, the battery, and the at least one light emitting diode. In addition, the at least one diode may include two parallel connected light emitting diodes connected in opposing directions.

In an alternative, the at least one light emitting diode may include at least a first light emitting diode connected in series between the first conductor of the communications line and a coupling with a communications device. The at least one light emitting diode may also include at least a second light emitting diode connected in series between the second conductor of the communications line and a coupling with the communications device. In addition, the coupling with the communications device may be a detachable coupling of a communications port such as an RJ11 communications port. Moreover, the first and second conductors of the communications line can be first and second wires of a telephone communications line such as an RJ11 communications line.

According to yet additional embodiments of the present invention, methods of testing a communications line including first and second conductors may include electrically coupling the first and second conductors of the communications line through a test switch, and providing indication of a completed electrical circuit through the test switch. Electrically coupling the first and second conductors may include manually activating the test switch.

For example, electrically coupling the first and second conductors of the communications line may include electrically coupling a series connection of at least one light emitting diode and a battery through the switch. Moreover, the test switch, the battery, and the at least one light emitting diode can be provided between the first and second conductors of the communications line so that electrical couplings between the first and second conductors and a communications device are free of the test switch, the battery, and the at least one light emitting diode. In addition, the at least one light emitting diode may include two parallel connected light emitting diodes connected in opposing directions.

In an alternative, the at least one light emitting diode may include at least a first light emitting diode connected in series between the first conductor of the communications line and a coupling with a communications device. Moreover, the at least one light emitting diode includes at least a second light emitting diode connected in series between the second conductor of the communications line and a coupling with the communications device. Moreover, the coupling with the communications device may include a detachable coupling of a communications port such as an RJ11 communications port. Moreover, the first and second conductors of the communications line can be first and second wires of a telephone communications line such as an RJ11 communications line.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
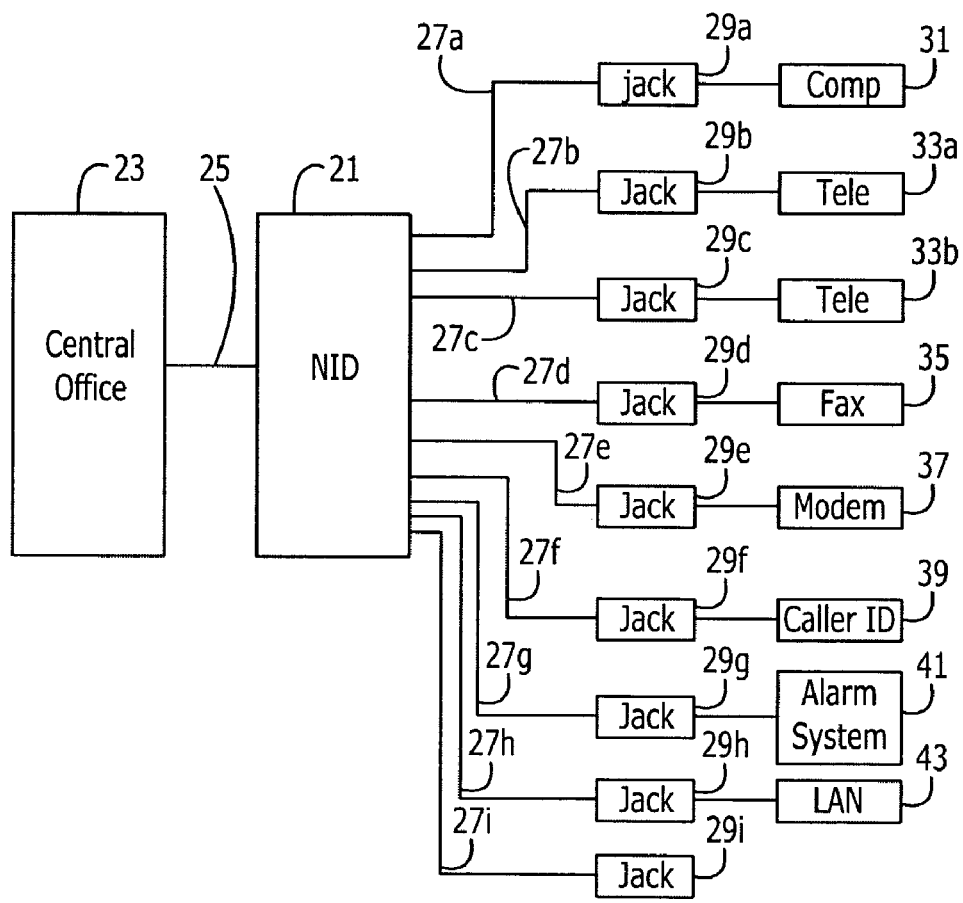
FIG. 1 is a block diagram of communications wiring according to embodiments of the present invention.

As illustrated in the block diagram of FIG. 1, communications for a residence may be provided according to embodiments of the present invention by a telephone service provider at a Network Interface Device (NID) 21 outside the residence. More particularly, the telephone service provider may provide service from a central office 23 to the NID 21 over an outside communications line 25 including a pair of conductors such as tip and ring conductors according to the RJ11 standard. Inside the residence, a plurality of inside communications lines 27a–i may provide coupling between respective telephone jacks 29a–i and the NID 21. Moreover, each telephone jack may provide a detachable coupling for a communications device, but a communications device does not have to be coupled to every jack. For example, one or more communications devices such as a computer 31, telephones 33a–b, a facsimile machine 35, a modem 37, a caller identification unit 39, an alarm system 41, and/or a local area network 43 may be coupled to one or more respective jacks 29a–h, and one or more jacks, such as jack 29i, may be left uncoupled to any communications device.

Residential communications can be provided according to the RJ11 standard wherein the outside communications line 25 includes a tip conductor and a ring conductor, and wherein each of the inside communications lines 27a–i includes respective tip and ring conductors coupled to the tip and ring conductors of the outside line through the NID 21. Moreover, the tip and ring conductor of each inside communication line 27a–i can be provided using a twisted pair of wires. Each of the jacks 29a–i can be provided using a faceplate assembly that can be mounted to a surface such as a wall within the residence. For example, a faceplate assembly may include input terminals configured to receive the tip and ring conductors of an inside communications line on a back surface thereof. A faceplate assembly may also include a communications port on a front surface thereof providing the detachable electrical coupling for a communications device. More particularly, the detachable electrical coupling may include output terminals electrically coupled with the input terminals of the faceplate assembly and providing detachable coupling according to the RJ11 standard. While embodiments of the present invention are discussed with respect to residential wiring, it will be understood that embodiments of the present invention may be implemented in non-residential communications wirings such as communications wirings for commercial, business, governmental, academic, and/or other organizational/business/personal communications operations.

Figure 2:
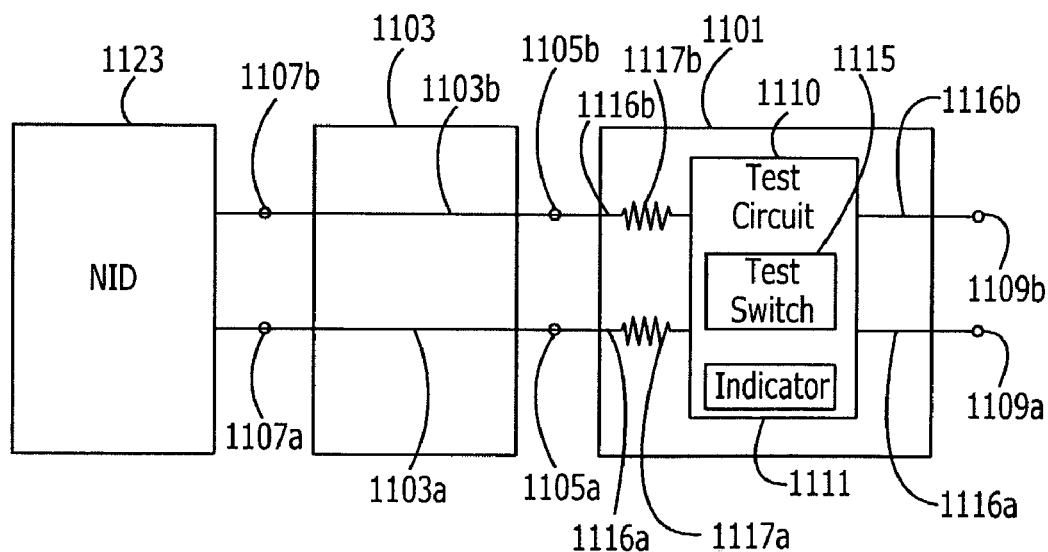
FIG. 2 is a diagram of a jack including a test circuit according to embodiments of the present invention.

As illustrated in FIG. 2, a jack 1101 according to embodiments of the present invention may include a test circuit 1110 used to detect a fault and/or short circuit along an inside communications line 1103 coupled thereto. As discussed above, the communications line may include a tip conductor 1103a and a ring conductor 1103b coupled between input terminals 1105a–b of the jack 1101 and output terminals 1107a–b of the NID 1123. The output terminals 1107a–b of the jack 1101 may be provided as a part of a communications port providing a detachable coupling for respective tip and ring conductors of a communications device, such as a port according to the RJ11 standard.

The test circuit 1110 of jack 1101 may include at least one indicator circuit 1111 and a test switch 1115. The test switch 1115 may provide electrical coupling between the first and second input terminals 1105a–b of the jack 1101 responsive to activation thereof. If an electrical circuit is completed through the first and second input terminals 1105a–b upon closing the switch 1115, the indicator circuit 1111 may provide indication thereof to indicate the presence of a fault and/or short circuit within the jack 1101, between conductors 1103a–b of the inside communications line 1103 coupled thereto, and/or at the NID 1123.

The location of such a fault and/or short circuit may be more precisely determined by decoupling the NID 1123 from an outside communications line and successively activating the test switch with the communications line 1103 coupled to both the NID 1123 and the jack 1101, with the communications line 1103 decoupled from the NID 1123 and coupled to the jack 1101, and with the communications line decoupled from the jack 1101. When the test switch is activated, the indication circuit may indicate the presence of a short circuit and/or fault somewhere in an element coupled thereto, and successive removal of elements and tests can be used to isolate the location of the short. The resistors 1117a–b represent resistances of signal conductors 116a–b of the jack. While the resistances 1117a–b are illustrated outside the test circuit, the resistances 1117a–b could alternately be illustrated within the test circuit and/or between the test circuit and output terminals 1109a–b.

The indicator circuit 1111, for example, may include one or more light emitting elements such as light emitting diodes or conventional filament lights and/or an audible indicator. In addition, the indicator circuit 1111 may be defined to include an electrical power source such as a battery that can generate a current through the switch 1115 and the indicator circuit 1111 when an electrical circuit is completed on activation of the switch.

The test switch 1115 may be manually operable such that it can be closed upon actuation of a button, switch, or other mechanical mechanism, or the test switch 1115 may be operable by other means such as electrical actuation. For example, the test switch 1115 may be a transistor that closes responsive to an electrical signal applied thereto.

While test circuits according to embodiments of the present invention have been discussed as components of jacks, test circuits according to alternate embodiments of the present invention may be used at other locations within a residential wiring such as within the communications line 1103, within NID 1123, between the NID 1123 and communications line 1103, and/or between communications line 1103 and jack 1101. For example, one test circuit could be included at the NID for each inside communication line extending therefrom. Accordingly, the inside communications lines could be isolated and tested at the NID. Test circuits according to embodiments of the present invention may also be included in communications devices such as telephones, facsimile machines, computers, modems, caller identification units, alarm systems, and/or local area networks coupled to the residential wiring.

When operating in a normal communications mode, the test switch is not activated so that the first and second input terminals 1105a–b are not coupled through the test switch 1115. Accordingly, communications signals can be transmitted through jack signal conductors between input terminals 1105a–b and output terminals 1109a–b.

Figure 3:
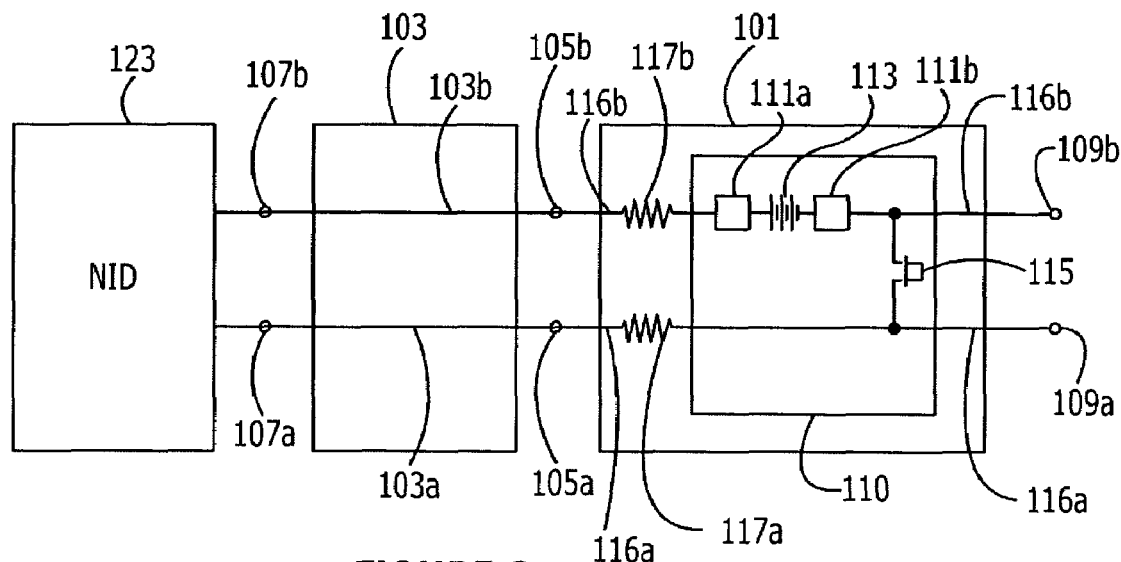
FIG. 3 is a diagram of a jack including a test circuit according to additional embodiments of the present invention.

As illustrated in FIG. 3, a jack 101 according to additional embodiments of the present invention may include a test circuit 110 used to detect a fault and/or short circuit along an inside communications line 103 coupled thereto. As discussed above, the communications line may include a tip conductor 103a and a ring conductor 103b coupled between input terminals 105a–b of the jack 101 and output terminals 107a–b of the NID 123. The output terminals 109a–b of the jack 101 may be provided as a part of a communications port providing a detachable coupling for respective tip and ring conductors of a communications device, such as a port according to the RJ11 standard.

The test circuit 110 of jack 101 may include first and second indicator circuits 111a–b, battery 113, and test switch 115. As illustrated, the test switch 115 provides electrical coupling between the first and second input terminals 105a–b of the jack 101 responsive to activation thereof. If an electrical circuit is completed through the first and second input terminals 105a–b upon closing the switch 115, an electric potential generated by the battery 113 can generate sufficient current to provide indication thereof at one or both of the indicator circuits 11a–b, and such indication may indicate a fault and/or short circuit within the jack 101, between conductors 103a–b of the inside communications line 103 coupled thereto, and/or at the NID 123.

The location of such a fault and/or short circuit may be more precisely determined by successively activating the test switch 115 with the communications line 103 coupled to both the NID 123 and the jack 101, with the communications line 103 decoupled from the NID 123 and coupled to the jack 101, and with the communications line decoupled from the jack 101. When the test switch is activated, one or both indication circuits may indicate the presence of a short circuit and/or fault somewhere in an element coupled thereto, and successive removal of elements and tests can be used to isolate the location of the short. While two indicator circuits 111a–b are illustrated in FIG. 3, a single indicator circuit may be used in test circuits according to embodiments of the present invention. The resistors 117a–b represent resistances of signal conductors 116a–b of the jack. While the resistances 117a–b are illustrated outside the test circuit, the resistances 117a–b could alternately be illustrated within the test circuit and/or between the test circuit and output terminals 109a–b. In addition, the battery 113 may be replaceable and/or rechargeable.

By placing the test circuit in the communications jack, a customer/user may be able to trouble shoot the respective communications line with relative ease and convenience. More particularly, the customer/user/technician may be able to test for and/or isolate a communications wiring failure down to a particular communications line and/or piece of equipment without a need for a multimeter. Accordingly, the customer need only actuate the switch (such as by pressing a button at the jack), and a light emitting diode can indicate the presence (lit) or absence (unlit) of a fault and/or short circuit.

When trouble shooting, the outside communications line can be decoupled from the NID and tested to determine if the problem is inside or outside the residence. If the outside communications line is functioning properly, the inside communications lines and jacks can be tested by decoupling each inside communications line from the NID, closing the test switch at each jack, and observing the test indicators during the test at each jack. If an indicator gives an indication of a completed electrical circuit (such as lighting an LED), there is indication of a fault and/or short circuit at the jack or the inside communication line or communication equipment coupled thereto.

The communication equipment is then unplugged from the jack providing the fault and/or short circuit indication, and the jack is retested. If the test does not indicate fault and/or short circuit after unplugging the communications equipment, then the fault and/or short circuit has been isolated to the communications equipment which should be repaired or replaced before reusing. If the test indicates a fault and/or short circuit after unplugging the communications equipment, the jack can be decoupled from the inside communications line and retested. If the test indicates a fault and/or short circuit after isolating the jack from the inside communications line, then the fault and/or short circuit is within the jack and the jack should be replaced. Otherwise, the fault and/or short circuit is within the inside communications line which should be replaced.

Moreover, a similar test circuit can be included in communications devices used in the residence to further isolate communications failures. For example, a test switch on each communications device can provide an electrical coupling between tip and ring conductors of the communications device, and one or more indicator circuits may provide indication of presence of a fault and/or short circuit in the communications device. Accordingly, the customer/user/technician can decouple all communications devices from jacks inside the residence and separately test each inside communications line and each communications device separately using built in test circuits. In addition, similar test circuits can be included for each inside communications line at the NID, so that tests for each inside communications line could be performed at the NID. Remote personnel at a customer service center could thus direct the customer/user through various tests with relative ease. Test circuits according to embodiments of the present invention can also facilitate repairs by trained technicians. For example, the technician could go through the residence and perform the tests without need of separate testing equipment.

As illustrated in FIG. 3, the indicator circuits 111a–b, and the battery 113 are provided in series between the test switch 115 and the ring conductor 103b. In an alternative, a single indicator circuit could be used or more than two indicator circuits could be used. In addition, the battery 113 could be located between the switch 115 and the tip conductor 103a. According to additional alternatives, the battery could be placed in series with the switch on a bridge between jack signal conductors so that the battery is not in the signal path during normal telephone operations. During normal use, jack signal conductors couple communications signals between input terminals 105a–b and 109a–b.

Figure 4:
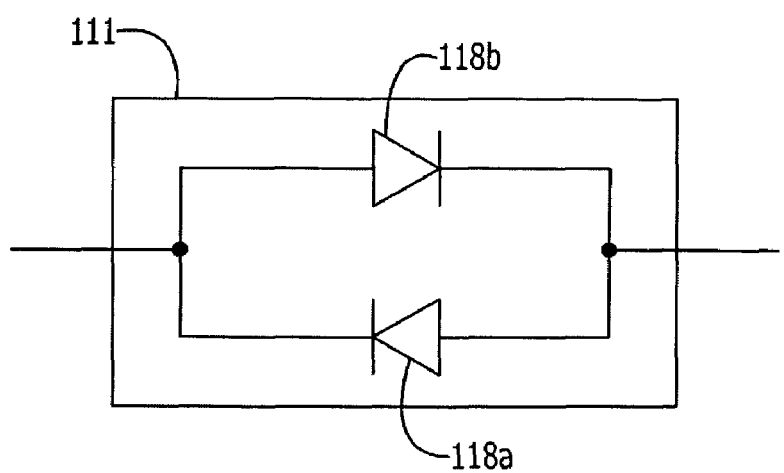
FIG. 4 is a diagram of an indicator circuit according to embodiments of the present invention.

Moreover, each indicator circuit may comprise one or a plurality of light emitting diodes (LEDs). In an alternative, an indicator circuit 111 may comprise two parallel connected LEDs 118a–b connected in opposite directions thereby facilitating current flow in both directions as illustrated in FIG. 4. In other alternatives, an indicator circuit may comprise a conventional filament light or other visual indicator, or a non-visual indicator such as an audible indicator.

When operating in a normal communications mode, the test switch 115 is not activated so that the first and second input terminals 105a–b are not coupled through the test switch 115. Accordingly, communications signals can be transmitted through jack conductors between input terminals 105a–b and output terminals 109a–b.

The test switch 115 may be manually operable such that it can be closed upon actuation of a button, switch, or other mechanical mechanism, or the test switch 115 may be operable by other means such as electrical actuation. For example, the test switch 115 may be a transistor that closes responsive to an electrical signal applied thereto.

Figure 5:
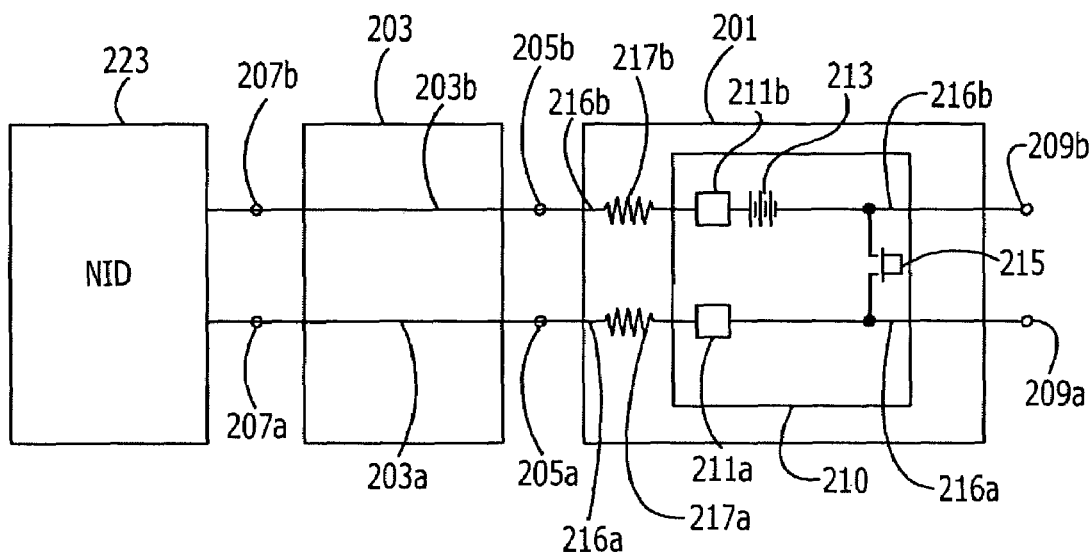
FIG. 5 is a diagram of a jack including a test circuit according to yet additional embodiments of the present invention.

As illustrated in FIG. 5, a jack 201 according to additional embodiments of the present invention may include a test circuit 210 used to detect a fault and/or short circuit along an inside communications line 203 coupled thereto. As discussed above, the communications line may include a tip conductor 203a and a ring conductor 203b coupled between input terminals 205a–b of the jack 201 and output terminals 207a–b of the NID 223. The output terminals 209a–b of the jack 201 may be provided as a part of a communications port providing a detachable coupling for respective tip and ring conductors of a communications device, such as a port according to the RJ11 standard.

The test circuit 210 of jack 201 may include first and second indicator circuits 211a–b, battery 213, and test switch 215. As illustrated, the test switch provides electrical coupling between the first and second input terminals 205a–b of the jack 201 responsive to activation thereof. If an electrical circuit is completed through the first and second input terminals 205a–b upon closing the switch 215, an electrical potential generated by the battery 213 can generate sufficient current to provide indication thereof at one or both of the indicator circuits 211a–b, and such indication may indicate a fault and/or short circuit within the jack 201, between conductors 203a–b of the inside communications line 203 coupled thereto, and/or at the NID 223.

The location of such a fault and/or short circuit may be more precisely determined by decoupling the NID 223 from an outside communications line and successively activating the test switch 215 with the communications line 203 coupled to both the NID 223 and the jack 201, with the communications line 203 decoupled from the NID 223 and coupled to the jack 201, and with the communications line decoupled from the jack 201. When the test switch is activated, one or both indication circuits may indicate the presence of a short circuit and/or fault somewhere in an element coupled thereto, and successive removal of elements and tests can be used to isolate the location of the short. While two indicator circuits 211a–b are illustrated in FIG. 5, a single indicator circuit may be used in test circuits according to embodiments of the present invention. The resistors 217a–b represent resistances of signal conductors 216a–b of the jack. While the resistances 217a–b are illustrated outside the test circuit, the resistances 217a–b could alternately be illustrated within the test circuit and/or between the test circuit and output terminals 209a–b. In addition, the battery 213 may be replaceable and/or rechargeable.

As illustrated in FIG. 5, the indicator circuit 211a is provided in series between the test switch 215 and the tip conductor 203a, and the indicator circuit 211b is provided in series between the test switch 215 and the ring conductor 203b. In addition, the battery 213 is illustrated connected in series between the indicator circuit 211b and the switch 215. In an alternative, a single indicator circuit could be used or more than two indicator circuits could be used. In addition, the battery could be located between the switch 215 and the tip conductor 203a, or the battery could be located between the indicator circuit 211b and the ring conductor 203b. According to additional alternatives, the battery could be placed in series with the switch on a bridge between jack signal conductors so that the battery is not in the signal path during normal telephone operations.

Moreover, each indicator circuit may comprise one or a plurality of light emitting diodes (LEDs). In an alternative, an indicator circuit 211 may comprise two parallel connected LEDs with LEDs connected in opposite directions thereby facilitating current flow in both directions as illustrated, for example, in FIG. 4, in other alternatives, an indicator circuit may comprises a conventional filament light or other visual indicator, or a non-visual indicator such as an audible indicator.

When operating in a normal communications mode, the test switch is not activated so that the first and second input terminals 205a–b are not coupled through the test switch 215. Accordingly, communications signals can be transmitted through jack signal conductors 216a–b between input terminals 205a–b and output terminals 209a–b.

The test switch 215 may be manually operable such that it can be closed upon actuation of a button, switch, or other mechanical mechanism, or the test switch 215 may be operable by other means such as electrical actuation. For example, the test switch 215 may be a transistor that closes responsive to an electrical signal applied thereto.

Figure 6:
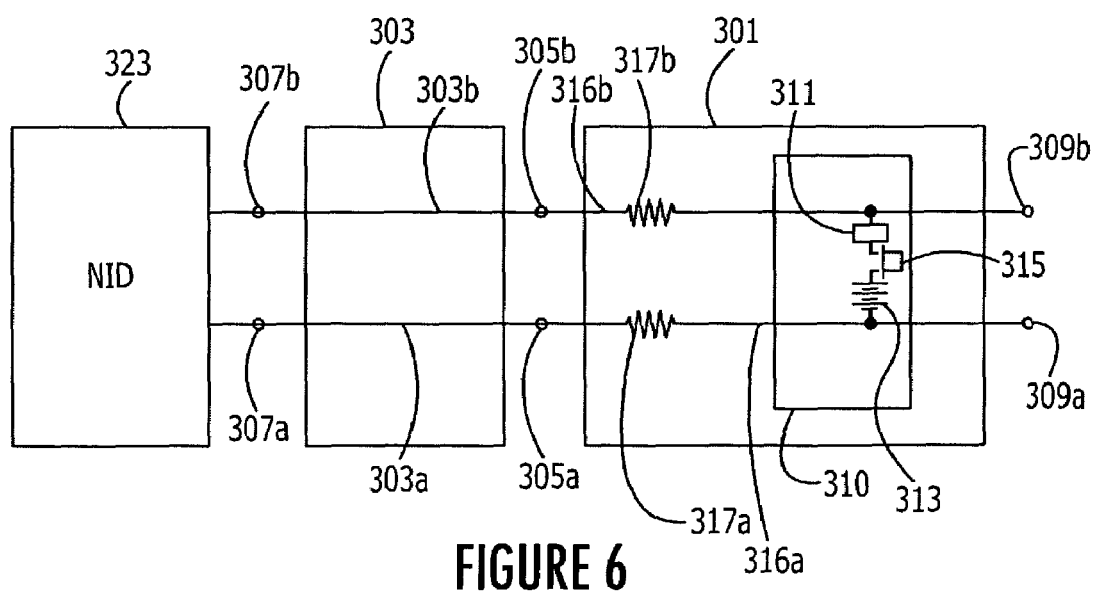
FIG. 6 is a diagram of a jack including a test circuit according to still additional embodiments of the present invention.

As illustrated in FIG. 6, a jack 301 according to yet additional embodiments of the present invention may include a test circuit 310 used to detect a fault and/or short circuit along an inside communications line 303 coupled thereto. As discussed above, the communications line may include a tip conductor 303a and a ring conductor 303b coupled between input terminals 305a–b of the jack 301 and output terminals 307a–b of the NID 323. The output terminals 309a–b of the jack 301 may be provided as a part of a communications port providing a detachable coupling for respective tip and ring conductors of a communications device, such as a port according to the RJ11 standard.

The test circuit 310 of jack 301 may include an indicator circuit 311, battery 313, and test switch 315. As illustrated, the test switch provides electrical coupling between the first and second input terminals 305a–b of the jack 301 responsive to activation thereof. If an electrical circuit is completed through the first and second input terminals 305a–b upon closing the switch 315, an electrical potential generated by the battery 313 can generate sufficient current to provide indication thereof at indicator circuit 311, and such indication may indicate a fault and/or short circuit within the jack 301, between conductors 303a–b of the inside communications line 303 coupled thereto, and/or at the NID 323.

The location of such a fault and/or short circuit may be more precisely determined by decoupling the NID 323 from an outside communications line and successively activating the test switch with the communications line 303 coupled to both the NID 323 and the jack 301, with the communications line 303 decoupled from the NID 323 and coupled to the jack 301, and with the communications line decoupled from the jack 301. When the test switch is activated, the indication circuit 311 may indicate the presence of a short circuit and/or fault somewhere in an element coupled thereto, and successive removal of elements and tests can be used to isolate the location of the short circuit and/or fault. While a single indicator circuit 311 is illustrated in FIG. 5, a plurality of indicator circuits may be used in test circuits according to embodiments of the present invention. The resistors 317a–b represent resistances of signal conductors 316a–b of the jack. While the resistances 317a–b are illustrated outside the test circuit, the resistances 317a–b could alternately be illustrated within the test circuit and/or between the test circuit and output terminals 309a–b. In addition, the battery 313 may be replaceable and/or rechargeable.

As illustrated in FIG. 5, the indicator circuit 311 is provided in series with the test switch 315 and the battery 313 on a bridge between the jack signal 316a–b conductors. Accordingly, the indicator circuit 311, the test switch 315, and the battery 313 are not in the signal path during normal telephone operations. In an alternative, a plurality of indicator circuits could be used.

Moreover, each indicator circuit may comprise one or a plurality of light emitting diodes (LEDs). In an alternative, the indicator circuit 311 may comprise two parallel connected LEDs with LEDs connected in opposite directions thereby facilitating current flow in both directions as illustrated, for example, in FIG. 4. In other alternatives, an indicator circuit may comprise a conventional filament light or other visual indicator, or a non-visual indicator such as an audible indicator.

When operating in a normal communications mode, the test switch is not activated so that the first and second input terminals 305a–b are not coupled through the test switch 315. Accordingly, communications signals can be transmitted through jack signal conductors between input terminals 305a–b and output terminals 309a–b.

The test switch 315 may be manually operable such that it can be closed upon actuation of a button, switch, or other mechanical mechanism, or the test switch 315 may be operable by other means such as electrical actuation. For example, the test switch 315 may be a transistor that closes responsive to an electrical signal applied thereto.

It should be noted that where an indicator circuit is provided on a signal conductor of the jack, such as illustrated in FIGS. 3 and 5, the indicator may provide indication of a signal during normal communications such as during a telephone call using a telephone coupled to the jack. For example, an LED or other light emitting device may light during a telephone conversation using a telephone coupled to the jack. Accordingly, the indicator circuit could be used to determine when a particular inside communications line is in use.

Figure 7A:
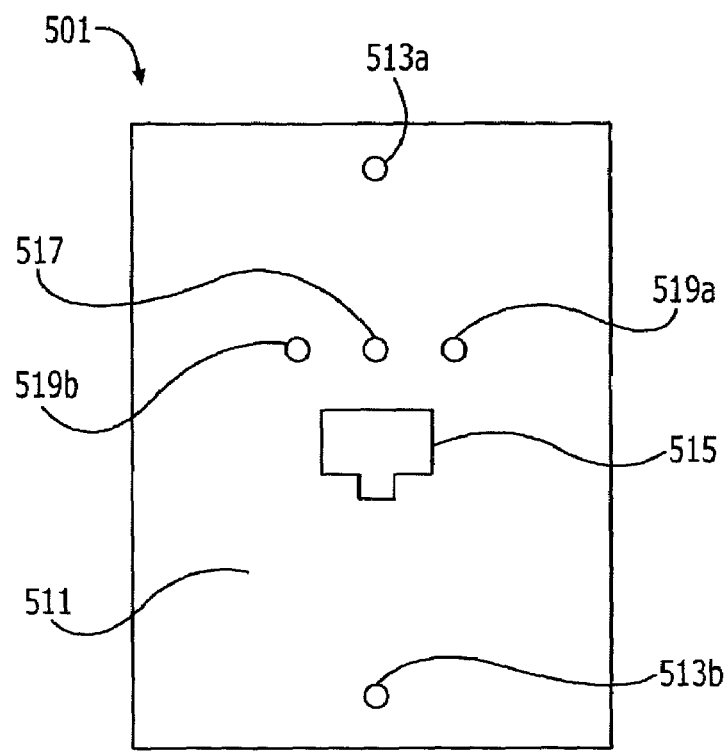
FIGS. 7a and 7b are front and back views of a jack according to embodiments of the present invention.
Figure 7B:
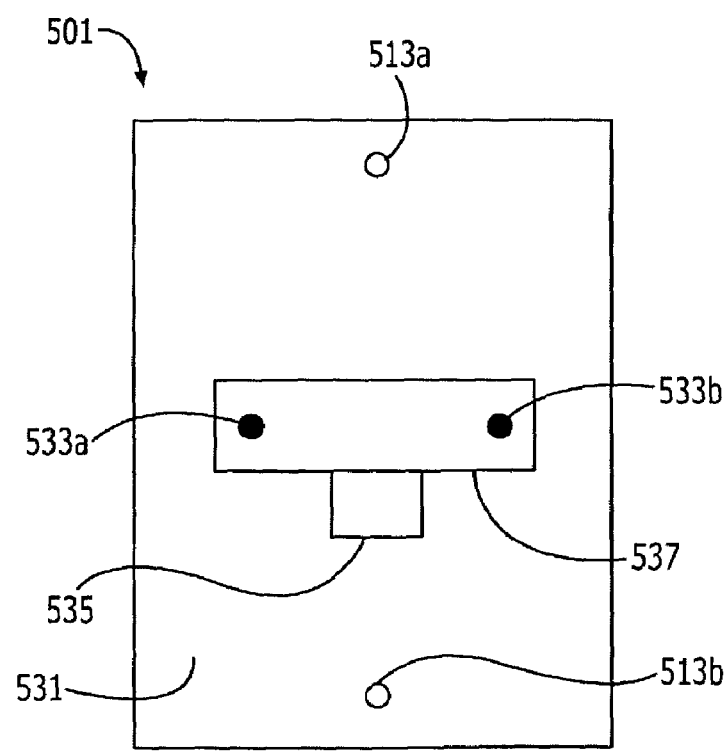

Front and backside views of faceplates 501 including jacks according to embodiments of the present invention are illustrated in FIGS. 7A and 7B. A front surface 511 of the faceplate 501 may include screw holes 513$a$–$b$, communications port 515, test switch actuator 517, and indicators 519$a$–$b$. A back surface 531 of the faceplate 501 may include screw holes 513$a$–$b$, input terminals 533$a$–$b$, a back portion 535 of the communications port 515, and a test circuit housing 537. Moreover, the back surface of the faceplate may provide a mounting surface to mount the faceplate to a surface such as a wall using screws through screw holes 513$a$–$b$.

The test circuit housing 537 may include test circuitry according to embodiments of the present invention such as discussed above with respect to FIGS. 1–6. The input terminals 533$a$–$b$ can thus be respectively coupled to tip and ring conductors of an inside communications line, and the communications port 515 may provide a detachable coupling to a communications device. Accordingly, a communications device can be plugged into the communications port to provide a detachable coupling between the communications device and the inside communications line coupled to the input terminals 533$a$–$b$. More particularly, the communications port 515 may be provided in accordance with the RJ11 communications standard.

The switch actuator 517 may be a depressible button associated with a test switch of the test circuit so that depressing the switch actuator closes the test switch thereby electrically coupling the input terminals 533$a$–$b$. The switch actuator 517 may be spring actuated so that the test switch is normally open in the absence of manual activation thereof. The indicators 519$a$–$b$ may be visible portions of light emitting indicators such as light emitting diodes or a speaker of an audible indicator. Each of the indicators, for example, is associated with a respective indicator circuit of the test circuit included in the jack. Accordingly, the faceplate may include one or a plurality of indicators with one indicator for each indicator circuit included in the test circuit.

In embodiments with light emitting indicators, a test can be performed by unplugging any communications device from the port 515, decoupling an outside communications line, and depressing the test switch actuator 517. If an electrical circuit is completed through the test switch, one or both of the indicators 519$a$–$b$ may give a visual indication of a short in an inside communications line and/or communications device coupled with the jack. If neither indicator gives a visual indication, other portions of the communications wiring should be checked for faults and/or short circuits. The test can be performed with the associated inside communications line coupled with the NID and/or with other inside communications lines and with the associated inside communications line decoupled from the NID.

As discussed above, test switches according to embodiments of the present invention may be manually operable such that closing may be affected upon mechanical actuation of a switch actuator 517 such as a button, switch, or other mechanical mechanism, or by other means such as electrical actuation. For example, a test switch may be a transistor that closes responsive to an electrical signal applied thereto.

Figure 8:
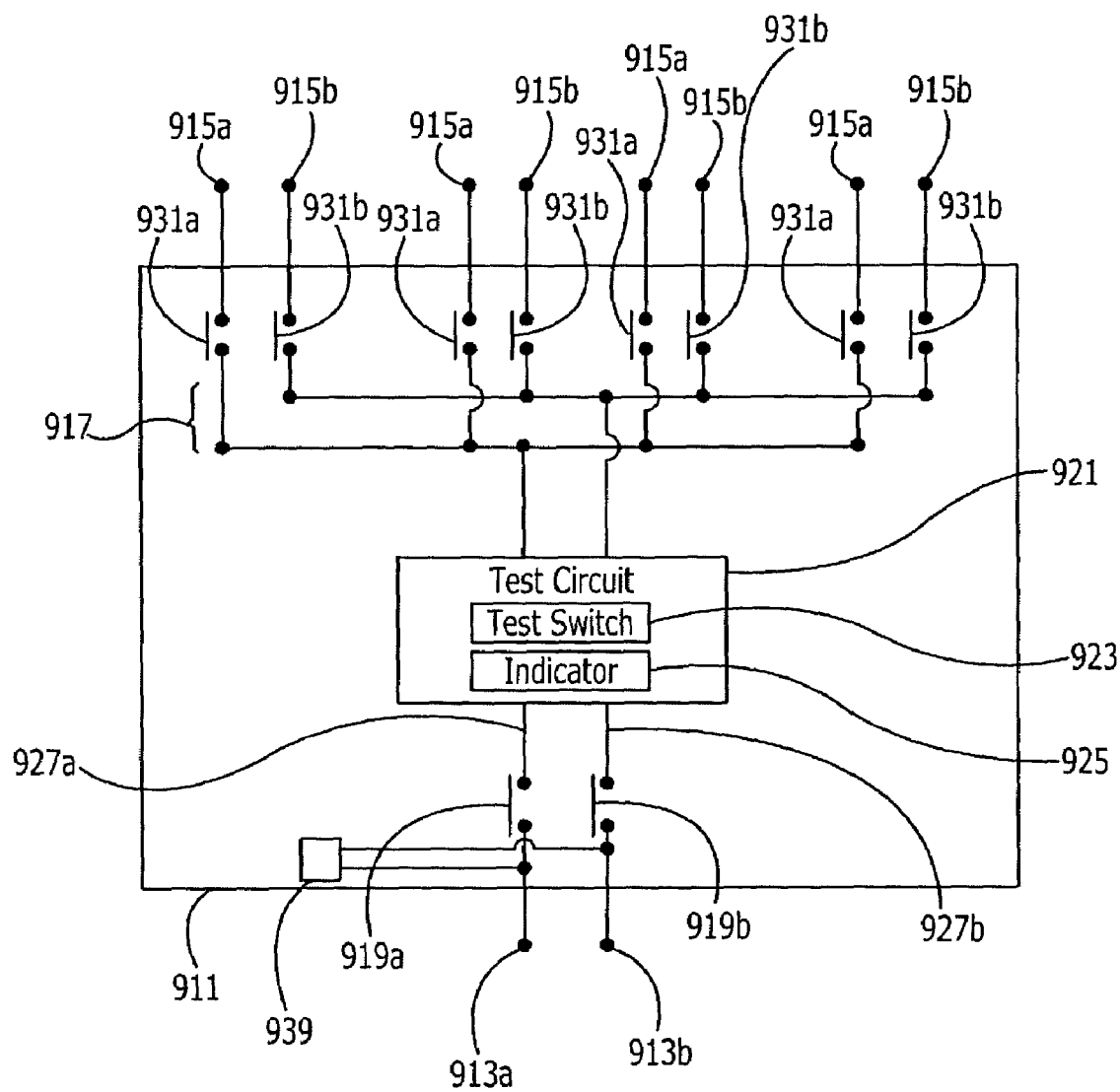
FIG. 8 is a diagram of a Network Interface Device according to embodiments of the present invention.

As illustrated in FIG. 8, test circuits according to still additional embodiments of the present invention may be included in a Network Interface Device (NID) 911. The NID 911 may include first and second input terminals 913$a$–$b$ configured to receive an outside communications line, and a plurality of outputs with each output comprising respective first output terminals 915$a$–$b$ wherein each output is configured to receive a respective inside communications line. The NID 911 may also include a bus 917 coupling each of the first and second output terminals 915$a$–$b$ with the first and second input terminals, and an outside communications line bridge 919$a$–$b$ between the first and second input terminals 913$a$–$b$ and the bus 917 providing coupling/decoupling to/from the outside communications line without decoupling the outside communications line from the input terminals 913$a$–$b$. The NID can also include a test circuit 921 between the outside communications line bridge 919$a$–$b$ and at least one of the outputs 915$a$–$b$, the test circuit comprising a test switch 923 configured to electrically couple respective first and second output terminals of the at least one of the outputs, and an indicator circuit 925 configured to provide indication of a completed electrical circuit through the test switch.

As shown, the test circuit can be provided along signal conductors 927$a$–$b$ of the NID 911 between the outside communications line bridge 919$a$–$b$ and the bus 917. One or more inside communications lines can be tested by opening the outside communications line bridge 919$a$–$b$, and closing the test switch 923 thereby isolating the signal conductors 927$a$–$b$ from the outside communications line and providing coupling of the signal conductors 927$a$–$b$. Indication of completion of an electrical circuit through the test switch 923 and one or more of the inside communications lines coupled with outputs 915$a$–$b$ can be provided using indicator 925. Completion of an electrical circuit with communication(s) devices decoupled from inside communications line(s) being tested or maintained "on-hook" may indicate a short circuit and/or fault in an inside communications line and/or communications device coupled to the NID. Moreover, the test circuit 921 can be implemented using circuits similar to those discussed above with regard to FIGS. 2–6.

As discussed herein, the terms "on-hook" and "off-hook" refer to conventional telephone operations, wherein a communications device provides a relatively high resistance between signal conductors of an inside communications line coupled thereto when "on-hook", and wherein the communications device provides a relatively low resistance between signal conductors or an inside communications line coupled thereto when "off-hook". When providing telephone operations, a communications device is generally "on-hook" when the handset it resting in its cradle awaiting a call, and a communications device is generally "off-hook" when the handset is lifted from its cradle to receive or place a phone call. As will be understood, manual operation (such as lifting a handset) is not required to take a communications device "on-hook" and "off-hook". A modem, for example, may transition between "on-hook" and "off-hook" under electronic control. Moreover, a telephone including caller identification may transition from "on-hook" to "off-hook" to identify a caller before the handset is lifted to answer a call.

In particular, the test switch 923 can be a normally open test switch provided on abridge between the signal conductors 927a–b. The indicator circuit may include a power source such as a battery and an indicating element such as a light emitting element such as one or more LEDs or conventional filament lights and/or an audible indicator. A battery and/or indicating element(s) may be provided in series with the test switch on the bridge between the signal conductors 927a–b. In an alternative, one or both of a battery and indicating element(s) may be included along a signal conductor 927a–b between the test switch and the bus 917. By activating the test switch while providing isolation from the outside communications line, indication of completion of an electrical circuit can be provided by the indicator 925. Accordingly, a short circuit and/or fault through one or more of the inside communications lines coupled to outputs 915a–b and/or communications devices coupled to the inside communications lines may be identified and/or isolated.

More particularly, the output isolation bridges 931 may be used to isolate all outputs except the output being tested so that one inside communications line can be tested at a time. For example, the output isolation bridges may be provided using switches, removable conductors, or other means to isolate the outputs.

The test circuit can also be used to test for continuity of inside communications lines. For example, the output isolation bridges can be opened for all outputs except the output for the inside communications line being tested, and conductors of the inside communications line being tested can be shorted at a distant end thereof, and/or a communications device coupled to the communications line being tested can be "off-hook". In this test situation, a lack of continuity can be indicated by a lack of completion of an electrical circuit through the activated test switch. With a light emitting indicator, a lighting can thus indicate proper continuity and a failure to light can indicate a continuity problem.

While the test circuit of FIG. 8 is illustrated between the bus 917 and the outside communications line bridge 919a–b, test circuits according to embodiments of the present invention may alternately be provided between output bridges 931a–b and respective outputs 915a–b. For example, one test circuit could be provided for each output. A test circuit may alternately be provided along conductors of the bus 917.

The outside communications line isolation bridge 919a–b may be provided using switches, removable conductors, or other means to isolate the input terminal 913a–b. The NID can also include a communications port 939 (such as a telephone jack according to the RJ11 standard) coupled between the isolation bridge 919a–b and the input terminals 913a–b. With the isolation bridge 919a–b open, the outside communications line can be tested by checking for a dial tone at the port 939.

During normal communications operations, the isolation bridges 931a–b and 919a–b are all closed thereby providing electrical coupling between an outside communications line and a plurality of inside communications lines. During testing operations, the outside communications line can be isolated at isolation bridge 919a–b from inside communications lines, and one or more inside communications lines can be tested using a common test circuit. In an alternative, a separate test circuit may be provided within the NID for each inside communications line.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A jack for a communications line, the jack comprising:
   first and second input terminals configured to receive respective first and second conductors of a communications line;
   first and second output terminals electrically coupled to the respective first and second input terminals, the first and second output terminals being configured to provide electrical coupling with respective first and second conductors of a communications device;
   a test switch configured to electrically couple the first and second input terminals together responsive to activation of the test switch; and
   an indicator circuit configured to provide indication of a completed electrical circuit through the test switch and the first and second input terminals.

2. The jack according to claim 1 wherein the test switch is normally open and is configured to be manually activated to close the test switch.

3. The jack according to claim 1 wherein the indicator circuit comprises a battery and at least one light emitting diode electrically coupled in series with the test switch between the first and second input terminals.

4. The jack according to claim 3 wherein the test switch, the battery, and the at least one light emitting diode are provided on a bridge between the first and second input terminals so that electrical couplings between the first and second input and output terminals are free of the test switch, the battery, and the at least one light emitting diode.

5. The jack according to claim 3 wherein the at least one diode is visible from a surface of the jack.

6. The jack according to claim 3 wherein the at least one diode comprises two parallel connected light emitting diodes connected in opposing directions.

7. The jack according to claim 3 wherein the at least one light emitting diode comprises at least a first light emitting diode connected in series between the first input terminal and the first output terminal.

8. The jack according to claim 7 wherein the at least one light emitting diode comprises at least a second light emitting diode connected in series between the second input terminal and the second output terminal.

9. The jack according to claim 1 wherein the first and second conductors of a communications line comprise first and second wires of an inside telephone communications line so that the first and second input terminals are configured to be electrically coupled between the inside telephone communications line and the communications device.

10. The jack according to claim 1 wherein the first and second conductors of a communications line comprise first and second wires of an RJ11 communications line.

11. The jack according to claim 1 wherein the first and second output terminals comprise first and second output terminals of an RJ11 communications port.

12. The jack according to claim 1 wherein the first and second output terminals are configured to provide a detachable electrical coupling with respective first and second conductors of a communications device.

13. The jack according to claim 1 further comprising:
    a faceplate having front and back surfaces wherein the first and second input terminals are on the back surface of the faceplate and wherein the first and second output terminals are on the front surface of the faceplate.

14. The jack according to claim 13 wherein the back surface is configured for mounting on an inside wall.

15. The jack according to claim 1 wherein the communications line comprises an inside telephone communications line.

16. The jack according to claim 15 wherein the indicator circuit is configured to provide indication of a completed electrical circuit through the test switch and the first and second conductors of the inside communications line.

17. A test circuit for a communications line including first and second conductors, the test circuit comprising:
   a test switch configured to electrically couple the first and second conductors of the communications line together responsive to activation of the test switch; and
   an indicator circuit configured to provide indication of a completed electrical circuit through the test switch and the first and second conductors of the communications line.

18. The test circuit according to claim 17 wherein the test switch is normally open and is configured to be manually activated to close the test switch.

19. The test circuit according to claim 17 wherein the indicator circuit comprises a battery and at least one light emitting diode electrically coupled in series with the test switch.

20. The test circuit according to claim 19 wherein the test switch, the battery, and the at least one light emitting diode are provided between the first and second conductors of the communications line so that electrical couplings between the first and second conductors and a communications device are free of the test switch, the battery, and the at least one light emitting diode.

21. The test circuit according to claim 19 wherein the at least one diode comprises two parallel connected light emitting diodes connected in opposing directions.

22. The test circuit according to claim 19 wherein the at least one light emitting diode comprises at least a first light emitting diode connected in series between the first conductor of the communications line and a coupling with a communications device.

23. The test circuit according to claim 22 wherein the at least one light emitting diode comprises at least a second light emitting diode connected in series between the second conductor of the communications line and a coupling with the communications device.

24. The test circuit according to claim 22 wherein the coupling with the communications device comprises a detachable coupling of a communications port.

25. The test circuit according to claim 24 wherein the communications port comprises an RJ11 communications port.

26. The test circuit according to claim 17 wherein the first and second conductors of the communications line comprise first and second wires of an inside telephone communications line.

27. The test circuit according to claim 17 wherein the first and second conductors of the communications line comprise first and second wires of an RJ11 communications line.

28. The test circuit according to claim 17 wherein the communications line comprises an inside telephone communications line.

29. The test circuit according to claim 28 wherein the indicator circuit is configured to provide indication of a completed electrical circuit through the test switch and the first and second conductors of the inside communications line.

30. A method of testing a communications line including first and second conductors, the method comprising:
   electrically coupling the first and second conductors of the communications line together through a test switch; and
   providing indication of a completed electrical circuit through the test switch and the first and second conductors of the communications line.

31. The method according to claim 30 wherein the test switch is normally open and wherein electrically coupling the first and second conductors comprises manually activating the test switch to close the test switch.

32. The method according to claim 30 wherein electrically coupling the first and second conductors of the communications line comprises electrically coupling a series connection of at least one light emitting diode and a battery through the switch.

33. The method according to claim 32 wherein the test switch, the battery, and the at least one light emitting diode are provided between the first and second conductors of the communications line so that electrical couplings between the first and second conductors and a communications device are free of the test switch, the battery, and the at least one light emitting diode.

34. The method according to claim 32 wherein the at least one light emitting diode comprises two parallel connected light emitting diodes connected in opposing directions.

35. The method according to claim 32 wherein the at least one light emitting diode comprises at least a first light emitting diode connected in series between the first conductor of the communications line and a coupling with a communications device.

36. The method according to claim 35 wherein the at least one light emitting diode comprises at least a second light emitting diode connected in series between the second conductor of the communications line and a coupling with the communications device.

37. The method according to claim 35 wherein the coupling with the communications device comprises a detachable coupling of a communications port.

38. The method according to claim 37 wherein the communications port comprises an RJ11 communications port.

39. The method according to claim 30 wherein the first and second conductors of the communications line comprise first and second wires of an inside telephone communications line.

40. The method according to claim 30 wherein the first and second conductors of the communications line comprise first and second wires of an RJ11 communications line.

41. The method according to claim 30 wherein the communications line comprises an inside telephone communications line.

42. The method according to claim 41 wherein providing indication of a completed electrical circuit through the test switch comprises providing indication of a completed electrical circuit through the test switch and the first and second conductors of the inside communications line.

43. A Network Interface Device comprising:
   first and second input terminals configured to receive an outside communications line;
   a plurality of outputs with each output comprising respective first and second output terminals wherein each output is configured to receive a respective inside communications line;

a bus coupling each of the first and second output terminals with the first and second input terminals;

an outside communications line bridge between the first and second input terminals and the bus providing coupling/decoupling to/from the outside communications line; and a test circuit between the outside communications line bridge and at least one of the outputs, the test circuit comprising a test switch configured to electrically couple respective first and second output terminals of the at least one of the outputs together, and at least one indicator configured to provide indication of a completed electrical circuit through the test switch and the respective first and second output terminals of the at least one of the outputs.

44. The Network Interface Device according to claim 43 wherein the test switch comprises a normally open switch coupled between first and second output terminals of at least one output and wherein the test switch is manually activated to close the test switch.

45. The Network Interface Device according to claim 44 wherein the at least one indicator comprises an indicator coupled in series with the test switch between first and second output terminals.

46. The Network Interface Device according to claim 44 wherein the at lest one indicator comprises an indicator coupled in series between an output terminal and an output terminal.

47. The Network Interface Device according to claim 44 wherein the test circuit comprises a battery in series with the at least one indicator and the test switch.

48. The Network Interface Device according to claim 43 wherein the test circuit is between the outside communications line bridge and the bus.

49. The Network Interface Device according to claim 43 further comprising:

an output bridge between one of the outputs and the bus, the output bridge providing coupling/decoupling to/from the bus.

50. The Network Interface Device according to claim 49 wherein the test circuit is between the output bridge and the respective output.

51. The Network Interface Device according to claim 43 wherein the at least one indicator is configured to provide indication of a completed electrical circuit through the test switch and first and second conductors of an inside communications line.

* * * * *